United States Patent [19]

Newbolt

[11] Patent Number: 5,630,691

[45] Date of Patent: May 20, 1997

[54] ROTARY AIRLOCK VALVE

[75] Inventor: Richard E. Newbolt, Sabetha, Kans.

[73] Assignee: MAC Equipment, Inc., Sabetha, Kans.

[21] Appl. No.: 514,950

[22] Filed: Aug. 14, 1995

[51] Int. Cl.$^6$ .................................................. G01F 11/24
[52] U.S. Cl. ........................................ 414/219; 222/368
[58] Field of Search .................................. 414/219, 220;
222/368; 251/304

[56] References Cited

U.S. PATENT DOCUMENTS

| | | | |
|---|---|---|---|
| 3,101,853 | 8/1963 | Long et al. | 414/219 X |
| 3,151,784 | 10/1964 | Tailor | 414/219 X |
| 4,179,043 | 12/1979 | Fischer | 414/219 X |
| 4,180,188 | 12/1979 | Aonuma et al. | 414/219 X |
| 4,565,305 | 1/1986 | Fischer et al. | 414/219 X |
| 5,201,441 | 4/1993 | Hoppe et al. | 222/368 |

FOREIGN PATENT DOCUMENTS

| | | | |
|---|---|---|---|
| 57-195040 | 11/1982 | Japan | 414/219 |
| 94/22750 | 10/1994 | WIPO | 222/368 |

Primary Examiner—Karen B. Merritt
Assistant Examiner—Stephen Gordon
Attorney, Agent, or Firm—Kokjer, Kircher, Bowman & Johnson

[57] ABSTRACT

A rotary airlock valve is provided with a ring seal. The airlock includes a tapered tubular housing formed about a longitudinal axis. The housing includes inlet and outlet ports to receive and discharge the material. The housing further includes end plates at opposite ends thereof which rotatably support opposite ends of a rotor assembly. The rotor assembly rotates within the housing about the longitudinal axis. The rotor includes multiple vanes with shrouds on opposite ends thereof. Seal rings are mounted upon inner surfaces of the end plates and biased towards outer surfaces of the shrouds to maintain a sealed relation between the shrouds and end plates. An expandable biasing tube is mounted proximate the seal rings to bias each seal ring toward and against the shroud. Each biasing tube is hollow to receive a predetermined amount of pressurized air. Each biasing tube is expandable as the rotor assembly slides axially along the rotational axis to maintain the seal ring in an engaging relation with the corresponding shrouds.

16 Claims, 1 Drawing Sheet

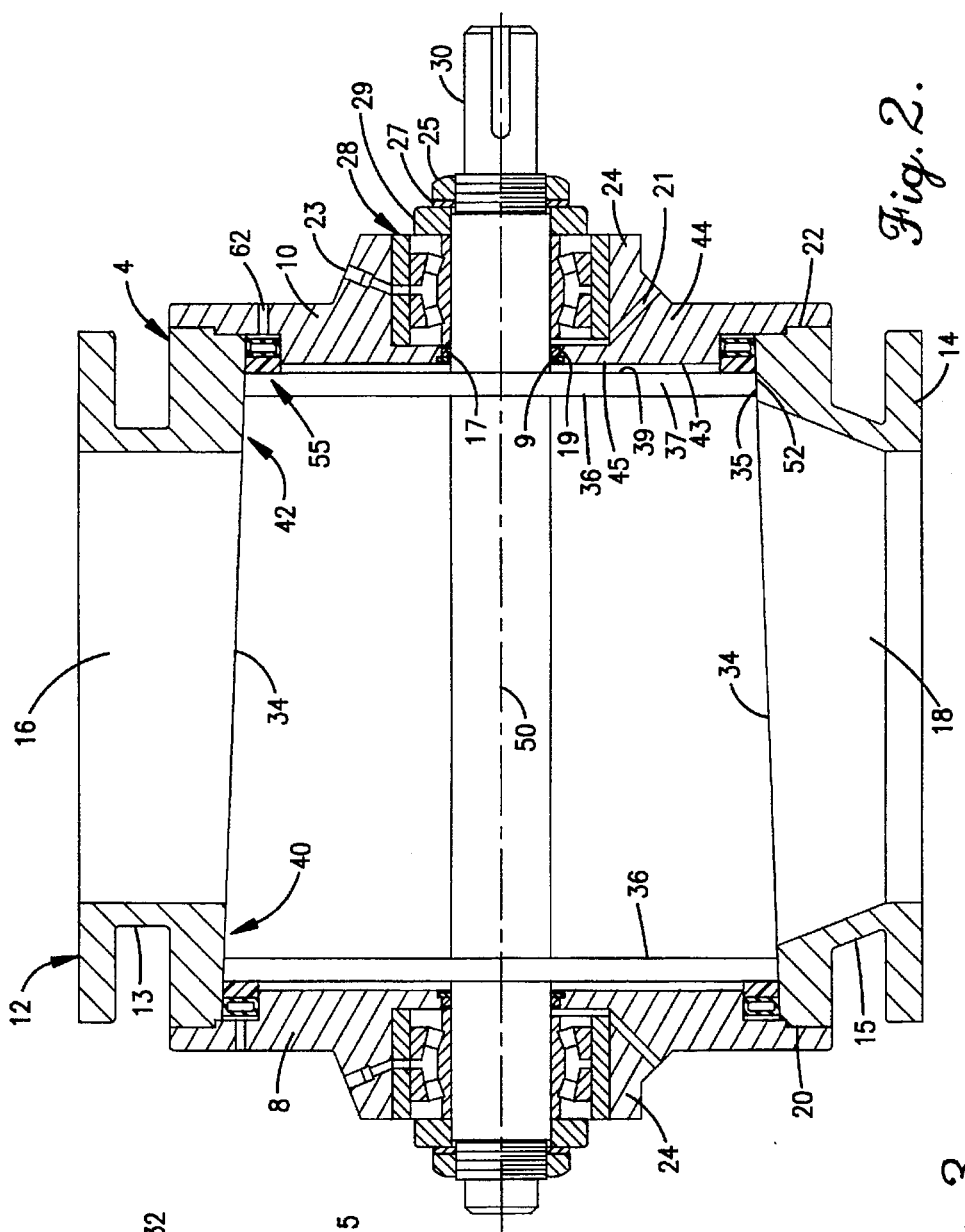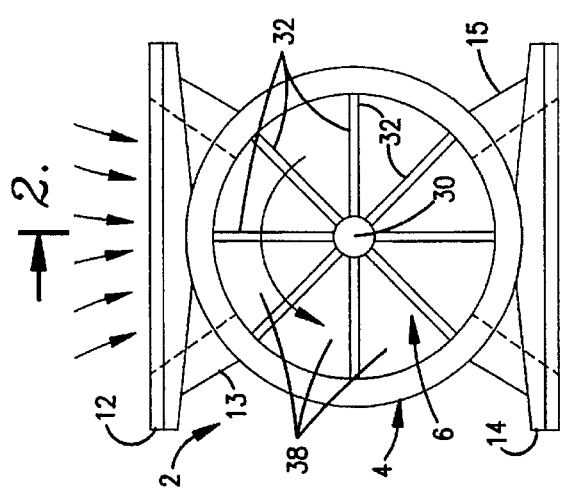

ROTARY AIRLOCK VALVE

BACKGROUND OF THE INVENTION

1. Field of the Invention

The present invention generally relates to a rotary airlock for use in a pneumatic conveyance system which delivers material to a pneumatic pipeline while preventing loss of air pressure therefrom. More specifically, the invention relates to a rotary airlock which includes an improved sealing mechanism which minimizes pressure and air losses about a rotor assembly in the airlock.

2. Description of Related Art

Pneumatic conveyance systems are generally utilized to convey granular, pelletized and particulate material. The conveyance system includes a pipeline through which an air stream is forced. Particulate material is delivered to and becomes entrained within the air stream to effect conveyance. In the past, rotary airlocks have been utilized to feed pneumatic conveying pipelines. Throughout the subject application, the term "airlock" is utilized to refer to a device which is able to move material continually between inlet and outlet ports while simultaneously maintaining an air pressure or vacuum differential between the inlet and outlet ports. Rotary airlocks are capable of moving various materials between the inlet and outlet ports, regardless of whether the airlock experiences an increased pressure or vacuum at the inlet port, or outlet port, or both.

The airlock includes a rotor assembly (also referred to as a paddle wheel, impeller or flipper) formed from a combination of blades and a shaft welded or assembled together. The blades (also referred to as vanes) represent metal plates formed in a "pie-shaped" cross-section to form pockets therebetween. The pockets between the vanes carry the material as the rotary airlock is operated. As the vanes and pockets rotate from the inlet port to the outlet port, the vanes and pockets are referred to as being on the "load side" of rotation and as the vanes and pockets pass through the discharge region proximate the outlet port, they enter the "return side" of rotation. The vanes and pockets are thereafter moved through the return side of rotation to a position in communicating relationship with the inlet section. The rotor assembly is rotatably received within a housing having the same contour as the rotor vanes. The vanes pass along the interior surface of the housing during rotation and maintain a sealed relation therewith. This sealed relation, to a significant extent, dictates the rotary airlocks ability to maintain a sealed relation between the inlet and outlet ports.

However, past rotary airlocks have offered poor efficiency, excessive maintenance, excessive operator manpower, production degradation, equipment wear and replacement, and lost production due to processing shut downs.

In the past, rotor assemblies have been proposed with differing numbers of vanes to enhance the sealing ability of the airlock proximate the outer edge of the vanes. In particular, a rotor assembly having ten vanes maintains at least four vanes in close contact with the housing at all times, while a rotor assembly having six vanes is only able to maintain two vanes in close contact with the housing at all times. Hence, the ten vane rotor maintains a better sealed relation with the housing. However, as the number of vanes increases, the capacity of each pocket decreases. Additionally, the opening to each pocket narrows, thereby restricting the flow of particulate material into the pocket when such material is of a "slow flowing" nature. Also, rotors having six vanes are capable of handling larger products such as peaches, potatoes, carrots and other food products better than rotors having ten vanes.

In the past, rotor assemblies have been constructed of two primary types, namely open ended and close ended rotors. An open ended rotor assembly represents one in which the pockets are defined at opposite ends by the end plates of the housing. In an open ended rotor, opposite ends of each vane rotate in close noncontacting proximity to the end plates of the housing. Hence, rotors of the open ended type include vanes having three wear surfaces (also referred to as three tip areas) and three surfaces along which pressurized air may escape from the airlock. In most open-ended rotor designs, the seal between opposite ends of the vanes and the end plates of the housing is directly exposed to the material and is the sole mechanism for preventing the material and air from passing about the ends of the vanes. Thus, the ability of the rotary airlock to maintain the material and air pressure within a pocket without leakage depends upon the performance of the seal. Such seals have proven disadvantageous as they permit excessive air loss about the rotor as the vanes wear.

To reduce air loss and wear, an enclosed end rotor assembly has been proposed which includes disk-shaped plates attached to opposite ends of each vane to enclose the ends of each pocket. The end plates are generally referred to as "shrouds" and may be secured to the vanes through welding, molding and the like. The shrouds enclosing opposite ends of each vane reduce the wear surfaces upon the rotor assembly to a single edge along the exterior surface of the vane and along the outer perimeter of the shroud which slidably communicates with the housing. Hence, the shrouds significantly reduce the wear area upon each vane.

The rotor assembly is formed to operate in a close tolerance with the inside diameter of the housing. The vane tips and the shroud tips are formed with an outer diameter located immediately adjacent the inner diameter of the housing bore. The clearance between the vane tips, shroud tips and the housing bore is preferably a few thousands of an inch. Past enclosed end rotor assemblies have been proposed which are formed with tapered vanes combining to form a rotor with a larger diameter at one end than the diameter at the opposite end. Similarly the interior tubular contour of the housing is formed in a cone shape with one end of the housing having a large interior diameter than an opposite end of the housing interior. This tapered configuration enables the tolerance between the rotor and interior of the housing to be adjusted by laterally shifting the rotor within the housing. This lateral adjustment compensates for wear, thermal expansion and other factors that affect the sealing efficiency of the rotor. The end shrouds upon a closed end rotor enable the rotor to be laterally shifted, while maintaining enclosed ends for the pockets.

The enclosed end rotor assembly, when assembled in the rotary airlock housing, maintains a gap or clearance between an outer surface of each shroud and the inner surface of the adjacent housing end plate. The gap enables the rotor assembly to be centered between the end plates of the housing or laterally shifted toward either end plate as needed. Thus, the gap distance between shrouds and end plates may be the same on both ends of the device or it may be greater on one end than the other.

In the past, several types of rotor tips have been proposed to minimize air loss between the vanes and housing, namely plain tips, fixed-relieved tips, adjustable tips and the like. Plain tips are constructed with a slight arcuate or convex surface formed along an arc corresponding to the interior curvature of the housing. Fixed relief tips include a narrower width proximate the tip area, as compared to a plain tip, by forming a beveled edge receding away from the tip in the direction of rotation. Adjustable tip designs include an add on vane tip that is bolted to the vane and designed to be adjustable closer to or away from the airlock housing. While these rotor tip designs attempt to minimize air loss between the vanes and housing, air may still escape through the clearance between the outer diameter of the shroud and the inner diameter of the housing. In particular, air may travel from the pockets proximate the outlet port of the valve through the clearance between the shroud and housing and into the gap between the shroud and end plate. The air passes upward along the end plate and back through the clearance between the shroud and housing into the pockets proximate the inlet port of the valve. Hence, air loss occurs about the ends of the rotor assembly by migrating between the inlet and outlet ports via the gap between the shroud and end plates.

In the past, a shroud seal assembly has been proposed for preventing air loss about the shrouds. The conventional shroud seal may be formed of a compressible packing, a leather lip, an elastomer, or a synthetic rubber. The shroud seal engages the outer surface of the shroud to prevent air migration therealong. The shroud seal is biased against the shroud with a plurality of mechanical springs distributed evenly about the rotational axis. The springs include one end mounted to the end plates and an opposite end biased against the shroud seal. The springs force the shroud seal against the shroud. The shroud seal operates in a close tolerance with the housing.

However, the foregoing mechanical spring type shroud seal has experienced several limitations. The biasing force induced by the mechanical springs varies dependent upon degree to which the spring is contracted. Hence, when the rotor assembly is laterally shifted to adjust the vane/housing clearance, the gaps between the shroud and end plates vary, with a first shroud gap decreasing while a second opposite shroud gap increases. Accordingly, the set of springs for the first shroud gap is compressed, while the set of springs for the second shroud gap is expanded. The compressed set of springs induces increased sealing force upon one shroud seal, while the expanded set of springs induces less sealing force upon a second shroud seal. Such variations in the shroud sealing force are undesirable, as it compromises the seal or apply excess friction upon the shroud. Hence, the mechanical springs must be manually adjusted every time the rotor assembly is shifted laterally.

Further, the conventional shroud seal includes an outer diameter which does not seal optimally against the inner diameter of the housing. Hence, air loss occurs between the shroud seal and housing. This air migrates past the springs and ultimately is lost about the backside of the shroud seal and through the inlet port. The shroud seals are unable to effectively seal against the housing since the springs only bias the shroud seals against the shroud and not radially against the housing. The shroud seals are formed with a constant outer diameter which is not adjustable radially and hence is unable to maintain a seal with the housing as the rotor and shroud seals are shifted laterally.

In the past, rotor shaft seals have been proposed, such as lip seals, and packing gland seals to prevent air pressure loss about the rotor shaft. However, conventional shroud seals do not effectively prevent abrasive materials that can migrate to the seal area destroy the rotor shaft seal quickly.

A need remains within the industry for an improved adjustable pneumatic seal for a rotary airlock valve which is self-aligning and requires low maintenance. It is an object of the present invention to meet this need.

SUMMARY OF THE INVENTION

It is an object of the present invention to provide a rotary airlock having an automatically adjustable seal ring which is capable of maintaining a sealed engagement with a rotor assembly even while the rotor shifts laterally within the housing.

It is a corollary object of the present invention to provide a rotary airlock with a self-adjusting ring seal to minimize migration of fine material into the seal area and to minimize air pressure loss about the shrouds between the outlet and inlet ports.

It is a further object of the present invention to provide a rotary airlock which includes a seal mechanism capable of laterally shifting parallel to the rotational axis of the rotor automatically to maintain a seal ring, while maintaining a seal against the housing and end plate.

It is a further object of the present invention to provide a rotary airlock having a shroud ring seal which is biased against the rotor with an adjustable amount of force.

These and other objects of the present invention are achieved by providing a rotary airlock with a ring seal. The airlock includes a tapered tubular housing formed about a longitudinal axis. The housing includes inlet and outlet ports to receive and discharge the material. The housing further includes end plates at opposite ends thereof which rotatably support opposite ends of a rotor assembly. The rotor assembly rotates within the housing about the longitudinal axis. The rotor includes multiple vanes with shrouds on opposite ends thereof. Seal rings are mounted upon inner surfaces of the end plates and biased towards outer surfaces of the shrouds to maintain a sealed relation between the shrouds and end plates. An expandable biasing tube is mounted proximate the seal rings to bias each seal ring toward and against the shroud. Each biasing tube is hollow to receive a predetermined amount of pressurized air. Each biasing tube is expandable as the rotor assembly slides axially along the rotational axis to maintain the seal ring in an engaging relation with the corresponding shrouds.

BRIEF DESCRIPTION OF THE DRAWINGS

In the accompanying drawings which form a part of the specification and are to be read in conjunction therewith and in which like reference numerals are used to indicate like parts in the various views:

FIG. 1 is an end view of a rotary airlock according to the present invention;

FIG. 2 illustrates a side sectional view taken along line 2—2 in FIG. 1 of a rotary airlock according to the present invention; and FIG. 3 illustrates an enlarged view of the region surrounding the ring seal of FIG. 2.

DETAILED DESCRIPTION OF THE INVENTION

FIG. 1 generally illustrates a rotary airlock assembly according to the present invention (generally designated by the reference numeral 2). The airlock 2 includes a housing 4, a rotor assembly 6 and end plates 8 and 10 (FIG. 2). The housing 4 is generally tubular in shape, but for an inlet port 12 located on one side of the tubular structure and an outlet port 14 located on an opposite side. The inlet and outlet ports 12 and 14 include rectangularly or round shaped face plates and flared hopper walls 13 and 15 forming a transition region from the face plates to the openings 16 and 18 (FIG. 2) in the top and bottom of the tubular portion of the housing 4. The tubular portion of the housing 4 is open at opposite ends 20 and 22 along its longitudinal axis 50 (FIG. 2). The ends 20 and 22 of the housing 4 securely receive end plates 8 and 10, respectively, and form an airtight seal therewith.

As illustrated in FIG. 2, both sides of the airlock assembly 2 are constructed in substantially the same manner, and thus only one side is explained hereafter. Each end plate 8 and 10 includes a body portion 44 having a center rim 24 extending along an axis 50 and having a disk-shaped flange 46 extending radially outward from the axis 50. The center rim 24 securely receives a bearing 28 to rotatably support a rotor shaft 30 of the rotor assembly 6. The bearings 28 are securely received within a journalled cavity in the center rims 24. The bearings 28 may be of a conventional type such as double tapered roller bearings with a locking ring 29 secured thereto. A washer 27 is secured against the inner ring via a locking nut 25 threaded upon the rotor shaft 30. The left and right side locking nuts 25 may be tightened and loosened to laterally shift the rotor assembly 6 within the housing 4.

A grease insert 23 may be provided within the body 44 to allow the user to inject grease into the bearing 28. A seepage passage 21 is also provided within the body 44, on the bottom side thereof, to afford drainage of moisture and the like. The center opening through the body 44 includes a journalled recess 19 proximate the inner surface 45 of the corresponding end plates 8 and 10. The recess 19 receives a tubular canted-coil spring shaft seal 17. The seal 17 is filled with a canted-coil spring which provides a constant sealing load enabling the seal to compensate for pressure variations and maintain intimate contact against the shaft 30 sealing surface and the end plate 10. A snap ring 9 is received within a journalled recess along the interior side of the recess 19 which retains the seal 17.

The rotor shaft 30 is aligned along the central longitudinal axis of the housing 4 and rotatably supported within the bearings 28. A plurality of rectangularly shaped vanes 32 are securely mounted about the perimeter of the shaft 30 to form a pie shaped cross-section (FIG. 1). As shown in FIG. 2, each vane 32 includes an outer edge 34 (also referred to as a rotor tip) and opposite end edges 36. The end edges 36 and shaft 30 securely receive circular shrouds 37 (circular flat plates) mounted thereto. The shrouds 37 enclose opposite ends of each pocket 38. Adjacent vanes 32 form a triangularly shaped pocket 38 (FIG. 1) which extends along a length of the vanes 32 between the shrouds 37. Each vane 32 is constructed with an outer edge 34 having a slight taper, such that the outer diameter of the vanes 32 and shroud 37 along the first side 40 is greater than the outer diameter of the vanes 32 and shroud 37 along the second side 42. The taper substantially conforms to a tapered interior contour of the housing 4. The locking collars 25 are adjusted to shift the tapered vanes 32 laterally within the housing 4.

As noted above, each end plate 10 is formed with a main body 44 having a disk-shaped flange 46 projecting radially outward therefrom. The body 44 and flange 46 include an inner surface 45 directed toward and facing the exterior surface 39 of an adjacent shroud 37. The adjacent surfaces 45 and 39 of the shroud 37 and body 44 are spaced apart by a cavity 43 extending along the end of the shroud 37 (FIG. 3). The exterior radial periphery of the shroud 37 forms a shroud edge 35 extending thereabout and spaced from an inner surface 52 of the housing 4 by a clearance distance 33 (FIG. 3). It is desirable to laterally shift the rotor 6 to minimize the clearance 33, thereby maximizing the seal between the vanes 32 and housing 4.

The flange 46 and body 44 combine to form a ledge 48 projecting inward therefrom and extending about the longitudinal axis 50. The ledge 48 is formed with an outer diameter somewhat smaller than an inner diameter of the inner surface 52 of the housing 4. As shown in FIG. 3, an annular cavity 54 is formed between the inner surface 52 of the housing and the ledge 48 of the end plate 8. The cavity 54 receives a ring-shaped seal 56, in the preferred embodiment, having a substantially rectangular cross-section. The circular ring seal 56 is formed concentric with the ledge 48 and extends about the perimeter of the groove 54. The ring seal 56 is formed of a wear resistant non-abrasive material, such as Teflon and/or polyurethane and the like. Optionally, the ring seal 56 may be constructed of ultra high molecular weight polypropelene. The ring seal 56 is slidably receipted upon the ledge 48, such that the ledge 48 guides the ring seal 56 along a linear direction of motion (as shown by arrow A) substantially parallel to the longitudinal axis 50. The ring seal 56 is biased in the direction of arrow A to maintain the inner ring surface 41 in an engaging relation with the exterior surface 39 of the shroud 37. In this manner, the ring seal 56 is biased to span the cavity 43 and sealably isolate the inner cavity region 43 from the clearance gap 33 about the shroud 37.

The biasing means comprises a tubular inflatable member 58 provided within the groove 54. The tubular member 58 is also ring-shaped to follow the groove 54 about the ledge 48 and to evenly engage the entire back surface of the ring seal 56 thereby maintaining an even biasing force. The inflatable member 58 includes a hollow chamber 60 therein which is airtight to receive pressurized gas. The chamber 60 communicates with a passage 62 (FIG. 2) containing an air valve (not shown) through which pressurized gas is inserted and discharged. The inflatable member 58 is formed of an expandable reinforced elastomer material. The member 58 includes inner and outer faces 58a and 58b which expand toward, and sealably engages, the ledge 48 and the inner surface 52 of the housing 4, respectively. The member 58 further includes a ring seal face 58c and a ring plate face 58d which expand toward, and sealably engage, the exterior surface 39 of the shroud 37 (through ring seal 56) and interior surface of the flange 46, respectively. The inflatable member 58 maintains an even biasing force upon the rear surface of the ring seal 56. As the pressure within the airtight chamber 60 varies, similarly varied are the biasing forces applied by the faces of the inflatable member 58 upon the ring seal 56, housing 4, flange 46 and ledge 48. In this manner, the inflatable member 58 continually biases the ring seal 56 inward against the shroud 37, while maintaining seals with the housing 4, flange 46 and ledge 48.

As locking collars 25 are adjusted to vary the clearance 33 and to shift the rotor assembly 6 laterally along the longitudinal axis 50, the shrouds 37 similarly shift laterally. As the shrouds 37 shift, the ring seals 56 move therewith responsive to the constant biasing forces of the member 58. Hence, the seal ring 56 prevents air and fine material from passing beyond the shroud edges 35 and beyond the clearance 33. The seal ring 56 prevents air and fines leakage, while maximizing the airlock's efficiency and the overall pneumatic conveyance system's air management. The inflatable member 58 may be pressurized to several psi greater than the pressure experienced within the conveyance system (such as greater than 75 pounds). The pressure within the inflatable member 58 may be adjusted via the valve 62 and a regulator (not shown). The ring seal 54 and inflatmember 58 are generally referred to as an adjustable seal mechanism 55.

The adjustable seal mechanism 55 enables the system to experience thermal expansion and lateral shifts without necessitating external intervention by an operator to correct the seal efficiency. As the rotor assembly wears, the tolerance between the rotor tips and the housing increases, thereby requiring the rotor assembly to be shifted laterally along the taper formed between the interior chamber of the housing and the exterior edges 34 of the vanes 32. As the rotor is shifted, the desired tolerance is maintained within the clearance 33 between the vanes 32 and the interior surface 52 of the housing 4. As the rotor assembly shifts along the taper, the shrouds 37 similarly shift along the longitudinal axis 50.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. In a rotary airlock for delivering material to a pneumatic pipeline, the airlock having a tubular housing formed about a longitudinal axis, the housing including inlet and outlet ports to receive and discharge material and having end plates that rotatably support opposite ends of a rotor assembly which is located in the housing and rotates about the longitudinal axis, the rotor assembly including multiple vanes spaced a vane clearance distance from the housing and having shrouds on opposite ends of the vanes spaced from the end plates by a gap, the improvement comprising:

a seal ring mounted between the shroud and the corresponding end plate, said seal ring engaging an exterior surface of said shroud about the longitudinal axis to maintain a sealed relation therewith; and expandable means, comprising a hollow inflatable tubular ring seal extending concentrically about the longitudinal axis of rotation, for biasing the seal ring toward and against the exterior surface of the shroud, said expandable means expanding radially outward to sealably engage an inner surface of the housing.

2. A rotary airlock according to claim 1, wherein said expandable means expands to sealably engage said seal, the housing, and the end plate.

3. A rotary airlock according to claim 1, wherein said end plate and housing include an annular cavity therein extending concentrically about the longitudinal axis, said cavity receiving said seal ring and expandable means.

4. A rotary airlock according to claim 1, wherein the expandable means forces the seal ring in a direction parallel to the longitudinal axis of the housing to maintain said sealed engaging relation against said exterior surface of said shroud.

5. A rotary airlock according to claim 1, wherein the expandable means includes a hollow airtight chamber which maintains a predetermined air pressure to evenly bias said seal ring against said shroud; and an air valve for adjusting an air pressure within said chamber to adjust a biasing force exerted upon said seal ring by said expandable means.

6. In a rotary airlock for delivering material to a pneumatic pipeline, the airlock having a tubular housing formed about a longitudinal axis, the housing including inlet and outlet ports to receive and discharge material and having end plates that rotatably support opposite ends of a rotor assembly which is located in the housing and rotates about the longitudinal axis, the rotor assembly including multiple vanes spaced a vane clearance distance from the housing and having shrouds on opposite ends of the vanes spaced from the end plates by a gap, the improvement comprising:

a seal ring mounted between the shroud and the corresponding end plate, said seal ring engaging an exterior surface of said shroud about the longitudinal axis to maintain a sealed relation therewith; and expandable means for biasing the seal ring toward and against the exterior surface of the shroud, said expandable means expanding radially outward to sealably engage an inner surface of the housing, said housing forming a chamber for receiving said rotor assembly, said chamber and said rotor assembly being tapered along said longitudinal axis, said seal ring and expandable means shifting along said longitudinal axis to maintain said sealed relation as the rotor assembly shifts along said longitudinal axis.

7. A rotary airlock for delivering material to a pneumatic pipeline, said airlock comprising:

a tubular housing extending along an axis and having first and second circular end plates at opposite ends of said housing;

a rotor assembly having a shaft rotatably mounted in and extending through holes in said end plates, said rotor assembly including vanes extending outward about said shaft, said shaft rotating along said axis;

a ring-shaped seal abutting an inner surface of said first end plate, said ring-shaped seal being slidable parallel to said axis to maintain an abutting sealed relation between said ring-shaped seal and outer ends of the rotor assembly; and an expandable means mounted between said seal and said first end plate.

8. A rotary airlock according to claim 7, wherein said expandable means includes a hollow inflatable tubular ring seal extending concentrically about said axis.

9. A rotary airlock according to claim 7, wherein said first end plate include therein a circular groove extending concentrically about said axis, said groove receiving said seal and said expandable means.

10. A rotary airlock according to claim 7, wherein the expandable means forces said ring-shaped seal in a direction parallel to the axis of the housing and into a sealed engaging relation against an exterior surface of a corresponding shroud.

11. A rotary airlock according to claim 7, wherein said expandable means includes a hollow airtight chamber which maintains a predetermined air pressure; and an air valve for adjusting an air pressure within said chamber to adjust a biasing force exerted upon said seal by said expandable means.

12. A rotary airlock according to claim 7, wherein said housing forms a chamber for receiving the rotor assembly, and wherein said chamber and said rotor assembly are tapered along said axis, said ring-shaped seal and said expandable means shifting along said axis to maintain said sealed relation as the rotor assembly shifts along the axis.

13. A rotary airlock according to claim 7, wherein said ring-shaped seal is a first ring-shaped seal, said rotary airlock further comprising a second ring-shaped seal abutting an inner surface of said second end plate, said second ring-shaped seal being slidable parallel to said axis to maintain an abutting sealed relation between the second seal and outer ends of the rotor assembly.

14. A rotary airlock according to claim 7, wherein said expandable means includes inner, outer, seal ring and end plate faces which sealably engage a ledge upon the end plate, the housing, said seal and the end plate, respectively.

15. A rotary airlock according to claim 7, wherein said expandable means expands to sealably engage said seal, the housing, and the end plate.

16. In a rotary airlock for delivering material to a pneumatic pipeline, the airlock having a tubular housing formed about a longitudinal axis, the housing including inlet and outlet ports to receive and discharge material and having end plates that rotatably support opposite ends of a rotor assembly which is located in the housing and rotates about the longitudinal axis, the rotor assembly including multiple vanes spaced a vane clearance distance from the housing and having shrouds on opposite ends of the vanes spaced from the end plates by a gap, the improvement comprising:

a seal ring mounted between the shroud and the corresponding end plate, said seal ring engaging an exterior surface of said shroud about the longitudinal axis to maintain a sealed relation therewith; and expandable means for biasing the seal ring toward and against the exterior surface of the shroud, said expandable means including inner, outer, ring seal and end plate faces which sealably engage a ledge upon the end plate, the housing, the seal and the end plate, respectively.

* * * * *